T. S. WATSON.
CONVEYING STRUCTURE.
APPLICATION FILED MAY 19, 1920.

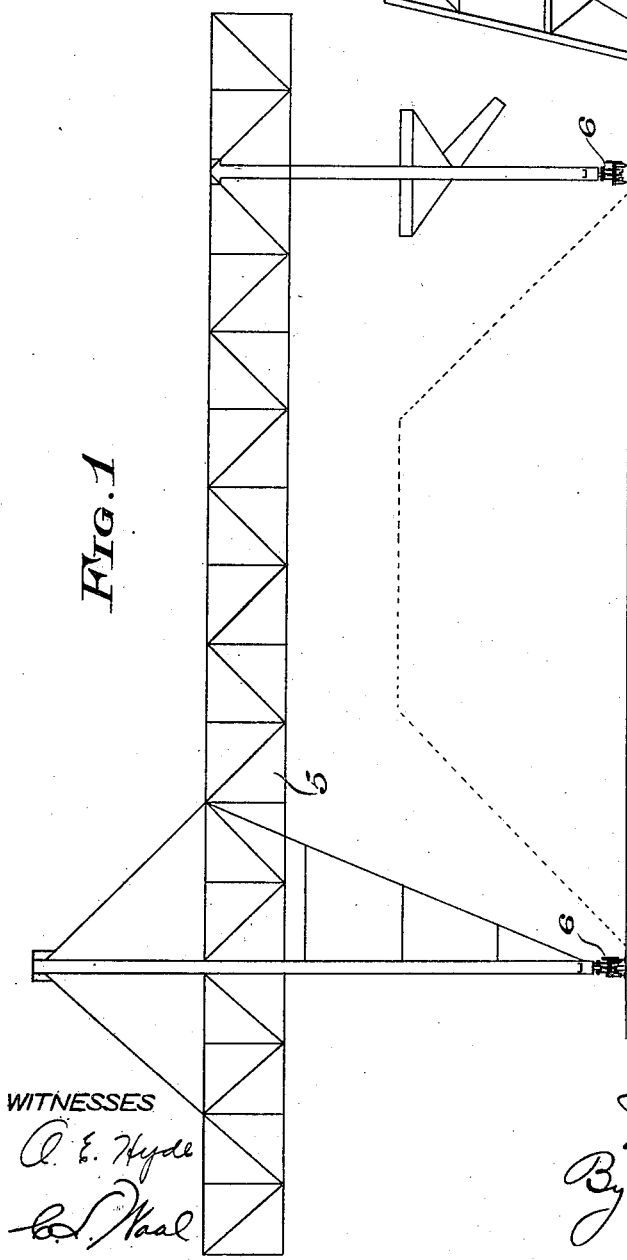

1,438,151.

Patented Dec. 5, 1922.
2 SHEETS—SHEET 2.

WITNESSES.
O. E. Hyde
C. L. Haal

INVENTOR
Thomas S. Watson
By R. S. Caldwell
ATTORNEY

Patented Dec. 5, 1922.

1,438,151

UNITED STATES PATENT OFFICE.

THOMAS S. WATSON, OF MILWAUKEE, WISCONSIN.

CONVEYING STRUCTURE.

Application filed May 19, 1920. Serial No. 382,485.

*To all whom it may concern:*

Be it known that I, THOMAS S. WATSON, a citizen of the United States, and resident of Milwaukee, county of Milwaukee, and State of Wisconsin, have invented new and useful Improvements in Conveying Structures, of which the following is a description, reference being had to the accompanying drawings, which are a part of this specification.

This invention relates to conveying structures which are adapted to travel along rails and transport hoisting or other apparatus mounted thereon to different points.

One of the objects of this invention is to provide a positive drive for propelling the trucks carrying the conveying structure along the track.

Another object of the invention is to provide a driving track that may be easily cleaned of ice, snow or other foreign matter and which in many respects is self-cleaning.

The invention further consists in the several features hereinafter set forth and more particularly defined by claims at the conclusion hereof.

Figure 3:
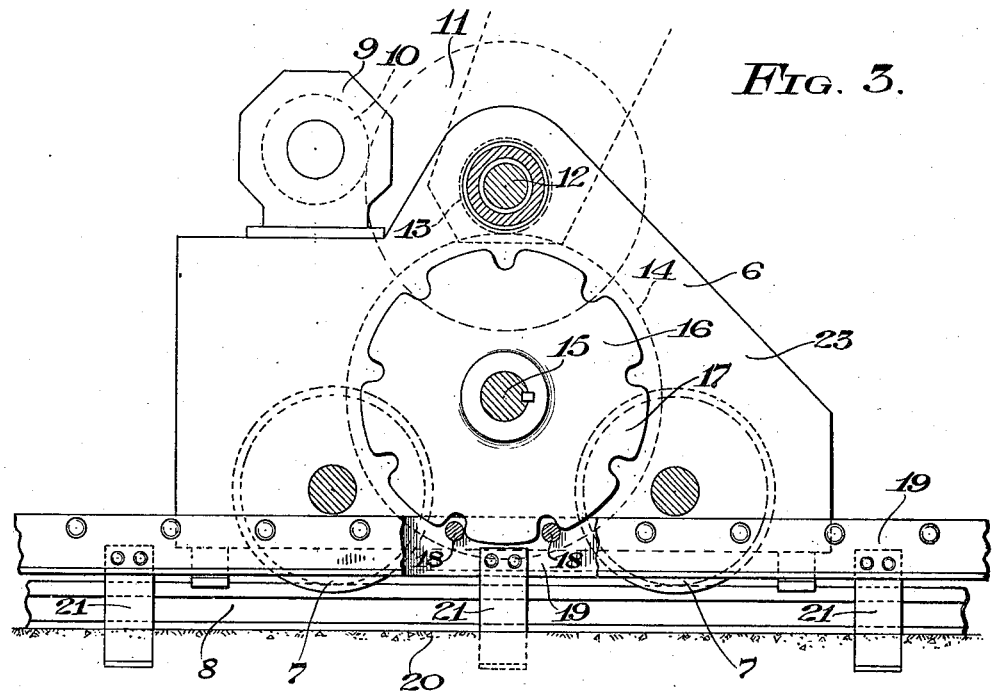
Figure 4:
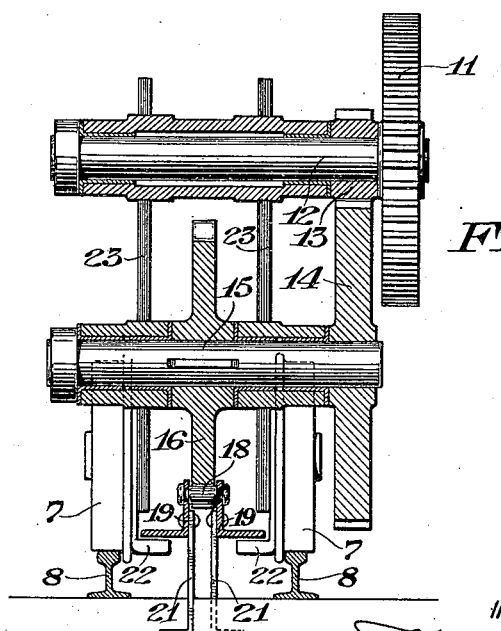

In the drawings: Fig. 1 is a side elevation of a conveying structure equipped with propelling mechanism embodying the invention; Fig. 2 is an end elevation of the structure shown in Fig. 1; Fig. 3 is an elevation view of one of the propelling mechanisms; Fig. 4 is a detail sectional view taken on the line 4—4 of Fig. 3.

Referring to the drawings, the illustrated conveying structure comprises a conveying bridge structure 5 mounted on trucks 6 having wheels 7 running on rails 8.

The propelling mechanism which may be used in connection with one or more of the trucks embodies a motor 9 having a gear 10 meshing with a gear 11 on a shaft 12. The shaft 12 carries a gear 13 meshing with a gear 14 on a propelling shaft 15. The propelling shaft 15 carries a driving gear 16 of peculiar formation in that it is formed with teeth 17 adapted to drivingly engage transversely disposed pins 18 forming a part of the driving track.

The driving track consists of frame members 19 of angle iron spaced apart and each supported above the road-bed 20 by uprights 21. The uprights 21 for one frame member are arranged in staggered relation to those of the other. The pins 18 are connected to the vertically disposed flanges of the angle irons 19.

Stabilizing hooks 22 are connected to the frame 23 of the truck and have their ends disposed beneath the horizontally disposed flanges of the members 19 with which they may engage, if for any reason the structure should start to tip to one side or the other, and thereby prevent dangerous tipping of the structure.

With the motor in operation, the rotation of the gear 16 through the gearing connection above described causes the gear to successively engage the pins 18 of the driving track to propel the truck along it in the desired direction, the wheels 7 running freely on the rails 8.

With the above construction it will be noted that there is no chance for material to collect between the pins 18 as such material is free to drop down to the road-bed and may be readily removed because of the elevated position of the angle irons 19.

The weight of the structure is carried on the rails 8 so that the driving mechanism is relieved of any strains imposed by this weight.

I desire it to be understood that this invention is not to be limited to any specific form or arrangement of parts except in so far as such limitations are specified in the claims.

What I claim as new and desire to secure by Letters Patent is:

1. Running gear for conveyors of the travelling bridge type comprising wheeled trucks upon which the legs of the bridge are mounted, a pair of rails at each end of the bridge upon which said trucks run, a pair of angle frame members disposed between each pair of rails, brackets spaced at intervals along the road-bed and supporting said frame members above the road-bed, transversely disposed pins secured to said frame members to form racks, stabilizing hooks fixed to the frames of the trucks and engageable with the base portions of said frame members to prevent tipping, and a motor-driven wheel on at least one truck at each end of the bridge engageable with the rack at that end of the bridge.

2. Running gear for conveyors of the travelling bridge type comprising wheeled trucks upon which the legs of the bridge are mounted, a pair of rails for supporting each leg of the bridge and upon which the trucks run, a pair of spaced frame members between each set of rails, transversely disposed pins secured to said frame members and forming a rack therewith, brackets arranged in staggered spaced relation along the road-bed and supporting said rack above the road-bed to prevent foreign matter clogging the racks, and a motor-driven wheel on at least one truck at each end of the bridge engageable with the rack for that end of the bridge.

3. In a propelling mechanism for conveying structure trucks, the combination of a pin rack, brackets arranged in staggered spaced relation along the road-bed and supporting said rack above the road-bed to prevent foreign matter clogging the rack and permitting the free removal of foreign matter from beneath the rack, means for supporting and guiding the truck, and a pin engaging propelling gear mounted on the truck.

4. In a propelling mechanism for conveying structure trucks, the combination of a pair of angle frame members with their base flanges projecting outwardly, angled brackets anchored to the roadbed and connected alternately to said frame members in spaced relation and supporting said frame members above the roadbed, transversely disposed pins secured to said frame members to form racks, means for supporting and guiding the truck, and a pin engaging propelling gear mounted on the truck.

In testimony whereof, I affix my signature.

THOMAS S. WATSON.